(12) United States Patent
Lemmon et al.

(10) Patent No.: US 9,276,294 B2
(45) Date of Patent: Mar. 1, 2016

(54) PLANAR HIGH DENSITY SODIUM BATTERY

(75) Inventors: John P. Lemmon, Kennewick, WA (US); Kerry D. Meinhardt, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 893 days.

(21) Appl. No.: 13/246,375

(22) Filed: Sep. 27, 2011

(65) Prior Publication Data

US 2012/0088133 A1     Apr. 12, 2012

Related U.S. Application Data

(60) Provisional application No. 61/390,831, filed on Oct. 7, 2010.

(51) Int. Cl.
*H01M 10/39* (2006.01)

(52) U.S. Cl.
CPC ...... *H01M 10/3909* (2013.01); *H01M 10/3918* (2013.01); *Y10T 29/4911* (2015.01)

(58) Field of Classification Search
CPC .......... H01M 10/399; H01M 10/3909; H01M 10/3918
USPC .......................................... 429/82, 83, 87, 88
See application file for complete search history.

(56) References Cited

U.S. PATENT DOCUMENTS

| | | | |
|---|---|---|---|
| 3,765,945 A | 10/1973 | Sudworth | |
| 3,783,024 A | 1/1974 | Gibson et al. | |
| 4,038,462 A * | 7/1977 | Rohr | 429/479 |
| 4,226,923 A | 10/1980 | Mikkor | |
| 4,945,012 A | 7/1990 | Bugga et al. | |
| 4,975,344 A * | 12/1990 | Wedlake et al. | 429/103 |
| 5,053,294 A | 10/1991 | Sernka et al. | |
| 5,112,703 A | 5/1992 | Koenig | |
| 5,554,457 A | 9/1996 | Bugga et al. | |
| 6,207,321 B1 | 3/2001 | Fukagawa et al. | |
| 7,255,961 B2 | 8/2007 | Schucker | |

FOREIGN PATENT DOCUMENTS

| | | | |
|---|---|---|---|
| EP | 1363343 A1 | | 11/2003 |
| EP | 1387426 | * | 4/2004 |
| EP | 1363343 B1 | | 12/2004 |
| JP | 05031205 | * | 2/1993 |
| JP | 2003 068356 A | | 3/2003 |
| WO | WO2008094550 | * | 8/2008 |

OTHER PUBLICATIONS

International Search Report/Written Opinion for International Application No. PCT/US2011/053482, International Filing Date: Sep. 27, 2011, Date of Mailing Dec. 30, 2011.

* cited by examiner

*Primary Examiner* — Ula C Ruddock
*Assistant Examiner* — Thomas Parsons
(74) *Attorney, Agent, or Firm* — A. J. Gokcek (57) ABSTRACT

A method of making a molten sodium battery is disclosed. A first metallic interconnect frame having a first interconnect vent hole is provided. A second metallic interconnect frame having a second interconnect vent hole is also provided. An electrolyte plate having a cathode vent hole and an anode vent hole is interposed between the metallic interconnect frames. The metallic interconnect frames and the electrolyte plate are sealed thereby forming gaseous communication between an anode chamber through the anode vent hole and gaseous communication between a cathode chamber through the cathode vent hole.

25 Claims, 5 Drawing Sheets

PLANAR HIGH DENSITY SODIUM BATTERY

CROSS-REFERENCE TO RELATED APPLICATIONS

This application claims priority to U.S. provisional application Ser. No. 61/390,831, filed Oct. 7, 2010, titled "PLANAR HIGH DENSITY SODIUM BATTERY", hereby incorporated by reference in its entirety for all of its teachings.

STATEMENT REGARDING FEDERALLY SPONSORE RESEARCH OR DEVELOPMENT

The invention was made with Government support under Contract DE-AC0676RLO 1830, awarded by the U.S. Department of Energy. The Government has certain rights in the invention.

TECHNICAL FIELD

This invention relates to a molten sodium battery. More specifically, this invention relates to making a molten sodium battery by incorporating vent holes that enable the assembly of repeat units of batteries.

BACKGROUND OF THE INVENTION

Environmental concerns over the use of fossil fuels and their resource constraints have spurred increasing use of energy generated from renewable sources such as wind and solar. Despite the abundance and ready availability, power generated by solar and wind resources are variable and uncontrolled. An effective approach to smooth out the intermittency is to use electrical energy storage (EES), storing excessive energy and releasing it when needed. The EES technologies are also demanded to improve the reliability and security of future electrical grids. Among various EES technologies, electrochemical energy storage systems or batteries are capable of reversibly storing and releasing electrical energy without involving "Carnot" cycles. One such technology is based on a $\beta''$-$Al_2O_3$ solid electrolyte (BASE) and this type of electrochemical device is often referred as Na-beta batteries (NBBs).

The high round-trip efficiency, high energy density and capability of energy storage for a duration of hours has led to an increased interest in NBB technologies for renewable storage and utility applications, as well as for clean, efficient vehicles. However, NBBs are batteries typically constructed on thick tubular electrolytes and operate at relatively high temperatures. Thus, while having promise from a theoretical perspective, these NBBs have a number of disadvantages, such as high capital cost and performance/safety issues, that have limited market penetration of the technology, One common cathode of NBBs is molten sulfur. This type of battery is known as sodium-sulfur (Na—S) battery. Na—S technologies for utility energy storage have also been developed. As an alternative to the molten $S/Na_2Sx$ cathode, porous $Ni/NiCl_2$ structures impregnated with molten $NaAlCl_4$ have been used in the so-called ZEBRA hatter.

The $\beta''$-$Al_2O_3$ solid electrolyte (BASE) belongs to beta-alumina group, which is characterized by structures composed of alternating closely-packed slabs and loosely-packed layers. The loosely-packed layers contain mobile sodium ions and are called conduction planes or slabs, in which the sodium ions are free to move under an electric field. The closely-packed slabs are layers of oxygen ions with aluminum ions sitting in both octahedral and tetrahedral interstices. These layers are referred as the spinel block, which is bonded to two adjacent spinet blocks via conduction planes or slabs. The sodium ions diffuse exclusively within the conduction layers perpendicular to the c axis. There are two distinct crystal structures in the group: $\beta$—$Al_2O_3$ (hexagonal; $P6_3/mmc$; $\alpha_o$=0.559 nm, $c_o$=2.261 nm) and $\beta''$—$Al_2O_3$ (rhombohedral; R3m; $\alpha_o$=0.560 nm, $c_o$=3.395 nm). The differ in chemical stoichiometry and stacking sequence of oxygen ions across the conduction layer and sodium-ion conductivity. $\beta''$—$Al_2O_3$ exhibits a higher sodium ionic conductivity (typically 0.2~0.4 S cm$^{-1}$ at 300° C.) and is the preferred phase for sodium battery electrolyte applications, The tubular design has been the dominate geometry of NBBs since the inception. However, the tubular design has many drawbacks. First, a tubular design requires a relatively thick cathode and smaller active surface area for a given cell volume, which limits power and energy densities. Secondly, the thicker electrolyte (>1 mm) typically employed in tubular designs also limits the high power characteristics. The tubular design complicates the interconnect between single cells and also impacts the overall cell packing efficiency. Finally, for metal halide sodium batteries they are typically manufactured by providing the sodium on the cathode side as a salt, such as NaCl. The sodium is then separated from the chloride and transferred to the anode side during the charge/discharge process. This method of manufacture limits the charge density of the resultant battery. Also, during the charge/discharge cycle, sodium battery electrode compartment undergoes volumetric changes. These changes along with the vapor pressure of molten sodium metal and other gases can create a differential pressure within the cell. This also limits the charge density of the resulting battery, because too much pressure can rupture the electrolyte.

The present invention is designed to overcome these drawbacks.

SUMMARY OF THE INVENTION

The present invention directed to a molten sodium battery and a method of making a molten sodium battery. In one embodiment of the present invention, a method of making a molten sodium battery is disclosed, The method comprises providing a first metallic interconnect frame having a first interconnect vent hole, The method also comprises providing a second metallic interconnect frame having a second interconnect vent hole. The method also comprises interposing an electrolyte plate having a cathode vent hole and an anode vent hole between the metallic interconnect frames. The method further comprises sealing the metallic interconnect frames and the electrolyte plate thereby forming gaseous communication between an anode chamber through the anode vent hole and gaseous communication between a cathode chamber through the cathode vent hole.

In one embodiment, the method further comprises stacking a plurality of electrolyte plates and metallic interconnect frames, wherein each interconnect frame is disposed on opposite sides of each electrolyte plate. Each plate has a cathode vent hole and an anode vent hole, and each interconnect frame has an interconnect vent hole. The plurality of plates and interconnect frames are sealed.

In one embodiment, the method further comprises providing a cathode composition containing a transition metal and sodium chloride in the cathode chamber. The method can further comprise adding a secondary electrolyte into the cathode chamber through the cathode vent hole. Alternatively, the transition metal, sodium chloride, and the secondary electrolyte are provided in the cathode chamber. In one embodiment, the transition metal is nickel, and the electrolyte plate is formed of β" alumina solid electrolyte (BASE). In one embodiment, the method further comprises a pressure accumulator in gaseous communication with the cathode vent hole and the anode vent hole.

In another embodiment of the present invention, a molten sodium battery is disclosed. The molten sodium battery comprises a first metallic interconnect frame having a first interconnect vent hole and a second metallic interconnect frame having a second interconnect vent hole, The battery also includes an electrolyte plate having a cathode vent hole and an anode vent hole interposed between the metallic interconnect frames. The interconnect frames and the electrolyte plate are sealed thereby forming gaseous communication between an anode chamber through the anode vent hole and gaseous communication between a cathode chamber through the cathode vent hole.

In one embodiment, the battery includes a plurality of electrolyte plates and metallic interconnect frames. Each interconnect frame is disposed on opposite sides of each electrolyte plate. Each plate has a cathode vent hole and an anode vent hole, and each interconnect frame has an interconnect vent hole. The plurality of plates and interconnect frames are sealed.

In one embodiment, the battery includes a cathode composition containing a transition metal and sodium chloride in the cathode chambers. The battery can also include a secondary electrolyte added into the cathode chambers through the cathode vent holes. Alternatively, the transition metal, sodium chloride, and the secondary electrolyte are provided in the cathode chamber. In one embodiment, the transition metal is nickel, and the electrolyte plate is formed of β" alumina solid electrolyte (BASE). In one embodiment, the battery further includes a pressure accumulator in gaseous communication with the cathode vent hole and the anode vent hole.

In another embodiment of the present invention, a plurality of electrolyte plates is provided, each having an anode side and a cathode side. The electrolyte plates further each have at least one cathode vent hole and at least one anode vent hole, A plurality of metallic interconnect frames is then provided, wherein the metallic interconnect frames and the electrolyte plates are alternated such that they thereby form alternating cathode chambers and anode chambers between each of the adjacent electrolyte base plates and the metallic interconnect frames. A cathode composition containing a transition metal and sodium chloride is then provided in the cathode chambers. The metallic interconnect frames and the electrolyte plates are then sealed, thereby forming gaseous communication between anode chambers through the anode vent holes and gaseous communication between cathode chambers through the cathode vent holes. A secondary electrolyte is introduced into the cathode chamber through the cathode vent holes.

DETAILED DESCRIPTION OF THE PREFERRED EMBODIMENTS

Figure 1A:
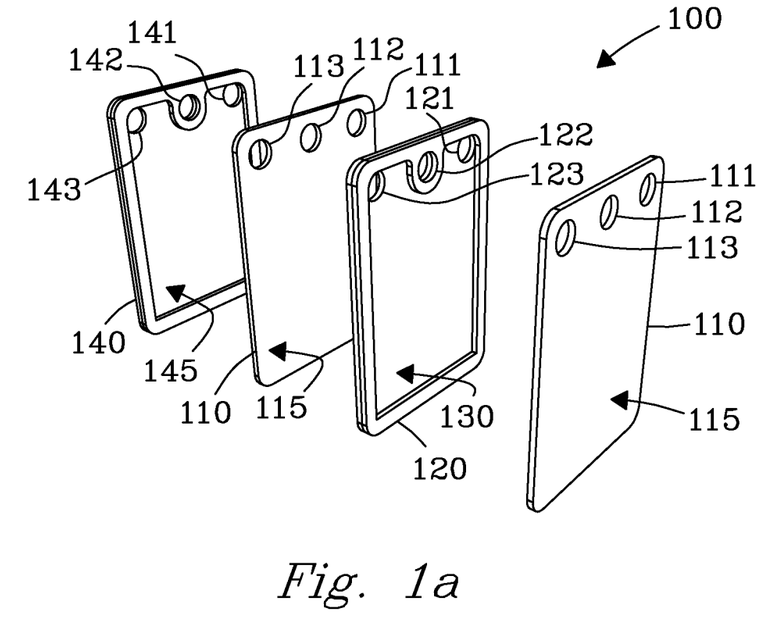
FIG. 1A is an illustration of a front view of one embodiment c present invention.
Figure 1B:
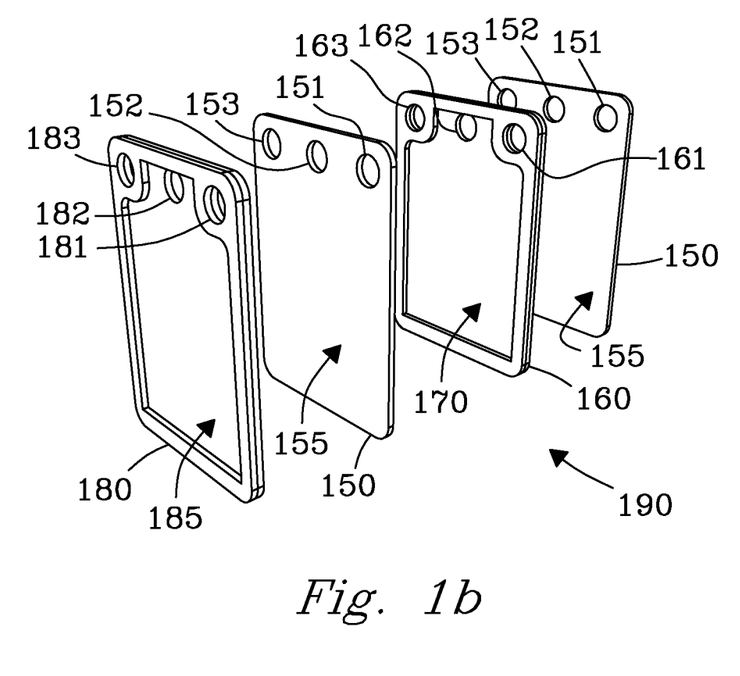
FIG. 1B is an illustration of a back view of one embodiment of the present invention.

For illustrative purposes, an illustration of one embodiment of the present invention is shown in FIGS 1A and FIGS. 1B. FIG. 1A shows a front side of a battery 100 including a first metallic interconnect frame 120, a second metallic interconnect frame 140 and an electrolyte plate 110. The first interconnect frame 120 includes at least one cathode vent hole 121 and 123 and at least one anode vent hole 122. The first interconnect flame 120 also includes a first cathode chamber 130 and a first anode chamber (not shown). The second interconnect frame 140 includes at least one cathode vent hole 141 and 143 and at least one anode vent hole 142. The second interconnect frame 140 also include a second cathode chamber 145 and a second anode chamber (not shown). The electrolyte plate 110 includes at least one cathode vent hole 111 and 113 and at least one anode vent hole 112. The electrolyte plate 110 also has an anode side 115 undo cathode side (not shown), The electrolyte plate 110 is interposed between the interconnect frames 120 and 140. When the interconnect frames 120 and 140 and the electrolyte plate 110 are sealed gaseous communication is formed between the anode chamber (not shown) of the first interconnect frame 120 through the anode vents holes 112 and 122, and gaseous communication is formed between the cathode chamber 145 of the second interconnect frame 140 and the cathode vent holes 111, 113, 141, and 143.

In one embodiment, the present invention can includes a plurality of interconnect frames and electrolyte plates to form a stack of batteries. In this embodiment, each interconnect frame is disposed on opposite sides of each electrolyte plate. Each electrolyte plate has at least one cathode vent hole and at least one anode vent hole, and each interconnect frame has at least one interconnect vent hole. Also, the plurality of plates and interconnect frames are sealed to form gaseous communication between each anode chamber through at least one anode vent hole and gaseous communication between each cathode chamber through at least one cathode vent hole.

FIG. 1B shows a battery 190 in accordance with one embodiment of the present invention, The FIG. 1B is an example of the back side of FIG. 1A. The battery 190 includes a first metallic interconnect frame 160, a second metallic interconnect frame 180 and an electrolyte plate 150. The first interconnect frame 160 includes at least one cathode vent hole 161 and 163 and at least one anode vent hole 162. The first interconnect frame 160 also includes a first anode chamber 170 and a first cathode chamber (not shown). The second interconnect frame 180 includes at least one cathode vent hole 181 and 183 and at least one anode vent hole 182. The second interconnect frame 180 also includes a second anode chamber 185 and a second cathode chamber (not shown). The electrolyte plate 150 includes at least one cathode vent hole 151 and 153 and at least one anode vent hole 152. The electrolyte plate is interposed between the interconnect frames 160 and 180. When the interconnect frames 160 and 180 and the electrolyte plate 150 are sealed gaseous communication is formed between the first anode chamber 170 of the first interconnect frame 160 through the anode vent holes 152 and 162, and gaseous communication is formed between the second cathode chamber (not shown) of the second interconnect frame 180 and the cathode vent holes 151, 153, 181 and 183.

Figure 2:
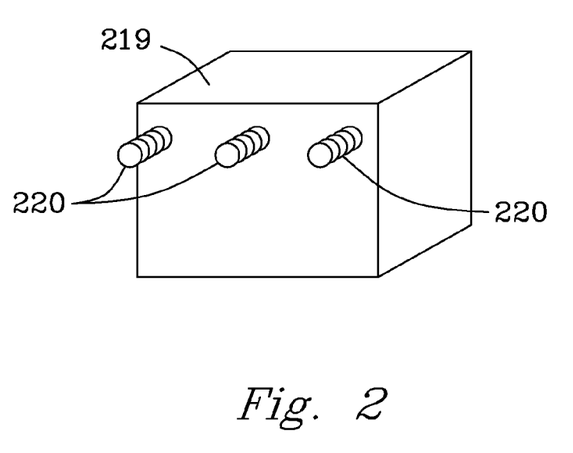
FIG. 2 is an illustration of an example of one embodiment of the present invention.

During operation, any gaseous pressure that is built up in the cathode and anode chambers can be vented out of the successive layers through the vent holes. As shown in FIG. 2, at the end of a stack of successive layers of cells 219, a pressure accumulator 220 in gaseous communication with the cathode and anode vent holes may also be provided, to simultaneously provide pressure relief to the stack while containing the gasses.

In one embodiment, the cathode chamber includes a cathode composition containing a transition metal and sodium chloride. The cathode composition can further include a secondary electrolyte. In another embodiment, the secondary electrolyte can be added into the cathode chamber through a cathode vent hole.

In one embodiment, the transition metal is nickel, and the electrolyte plate is formed of β" alumina solid electrolyte (BASE). In one embodiment, the present invention includes a pressure accumulator in gaseous communication with a cathode vent hole and an anode vent hole.

The present invention allows, in one embodiment, the application of sodium metal to an anode side of the cell after the cell is sealed together through the vent holes, thereby forming the battery in a charged state. This allows more sodium to be present in the cell than prior art methods of battery fabrication where the battery is formed in a discharged state, and the sodium is provided on a cathode side as a salt, and then transferred to the anode side during the charge/discharge process. In this manner, the batteries of the present invention have more sodium metal on the anode side than can be provided by separation of a salt in the charge/discharge process, and thus the batteries of the present invention have much higher power densities than the prior art. The invention further prevents damage to the electrolyte layer by the build-up of pressure during the charge/discharge process.

A series of experiments were conducted to demonstrate embodiments of the present invention, BASE discs were fabricated via the vapor phase process described in A. V. Virkar, J. -F. Jue, K. -Z. Ring, U.S. Pat. No. 6,117,807 (2000) and P. Parthasarathy, N. Weber, A. V. Virkar, ECS Trans 6, 67 (2007), the entire its of which are hereby incorporated by this reference.

The starting powders were high purity $\alpha$—$Al_2O_3$ and YSZ (Yttria-stabilized zirconia), The mixture of 70 vol.% $\alpha$—$Al_2O_3$ and 30 vol.% YSZ were ball-milled, dried and sieved. The powders were then mixed with dispersant and solvents in a certain ratio and milled for 24 hours.

Plasticizer and hinder were added into the solution and it was further milled for 24 h, The slip was de-aired and cast into a thin sheet. After lamination, the sheet was punched into circular discs. The discs were fired at 1600° C. in the air o achieve a full density (>99%), The samples were then creep-flattened and ready for converted to $\beta"$—$Al_2O_3$, Daring the conversion process, the $\alpha$—$Al_2O_3$/YSZ discs were packed in packing powders ($\beta"$—$Al_2O_3$, prepared separately) and heat-treated at elevated temperatures (e.g., 1450° C.) in the air for a certain time. The conversion occurs by a coupled transport of sodium and oxygen ions from the packing $\beta"$—$Al_2O_3$ powders to the samples. The phase structures of the as-sintered and converted samples were determined by powder X-ray diffraction (XRD). The microstructures of the samples were observed using scanning electron microscope (SEM) equipped with an energy-dispersive X-ray spectroscope (EDS) and sodium ion distribution across the BASE was examined with SEM/EDS as well. The achieved $\beta"$—$Al_2O_3$ discs had a thickness of 1 mm. The packing $\beta"$—$Al_2O_3$ powders were synthesized using starting precursors of boehmite, $Na_2CO_3$ and $Li_2CO_3$ via solid-state reaction described in A. Vanzyl, M. M. Thackeray, G. K. Duncan, A. I. Kingon, R. O. Heckroodt, Mater. Res. Bull., 28, 145 (1993) and X. C. Lu, G. G. Xia, J. P. Lemmon, Z. G. Yang, J. Power Sources, 195, 2431 (2010), the entire contents of which are hereby incorporated by this reference.

Figure 3:
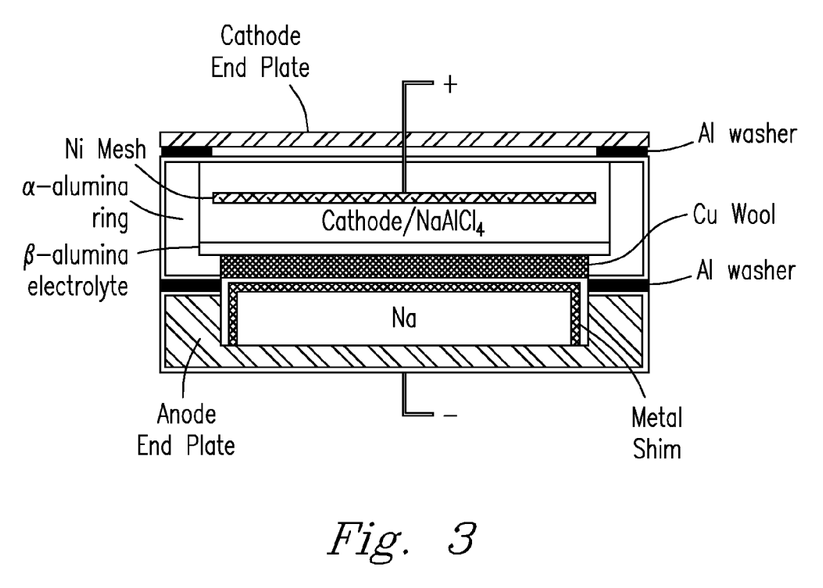
FIG. 3 is a schematic of a sodium-nickel chloride cell with a planar design.

The single cells were then tested as follows, A single cell is shown schematically in FIG. 1. The converted $\beta"$—$Al_2O_3$ disc with the diameter of 26 mm was glass-sealed to an outer thicker $\alpha$—-$Al_2O_3$ ring. The cell was then moved into a glove box and assembled in a discharged state with starting powders consisting of Ni, NiCl and small amounts of additives. The powders with the amount of 2 g were thoroughly mixed and granulated. The granulate was then poured into the cathode compartment. After a final drying treatment to get rid of all traces of moisture, molten $NaAlCl_4$ was vacuum-infiltrated into the granulate at 250° C. A Ni mesh and wire was imbedded into the cathode as current collector. At the anode side, a metal shim was inserted into the anode compartment and copper wool filled the gap between the electrolyte and shim. Anode and cathode end plates were then compressed to the $\alpha$—$Al_2O_3$ ring with the help of alumina washers, as shown in FIG. 3. Platinum leads were welded to the electrode end plates as current collector. The effective cell area was 3 $cm_2$.

The assembled cell was placed in a furnace inside the glove box and cell testing was carried out using an electrochemical interface (Solatron 1470E, Solartron Analytical) at 300° C. A constant current of 10 mA was used for initial five charge/discharge cycles. After cell performance was stabilized, it was further cycled at a higher rate (e.g., C/3). A low current rejuvenation process was employed for each ten higher current cycles to recover the cell performance. Microstructure of the cathode after long-term cycling was analyzed using SEM/EDS to evaluate its contribution to cell performance degradation.

Figure 4:
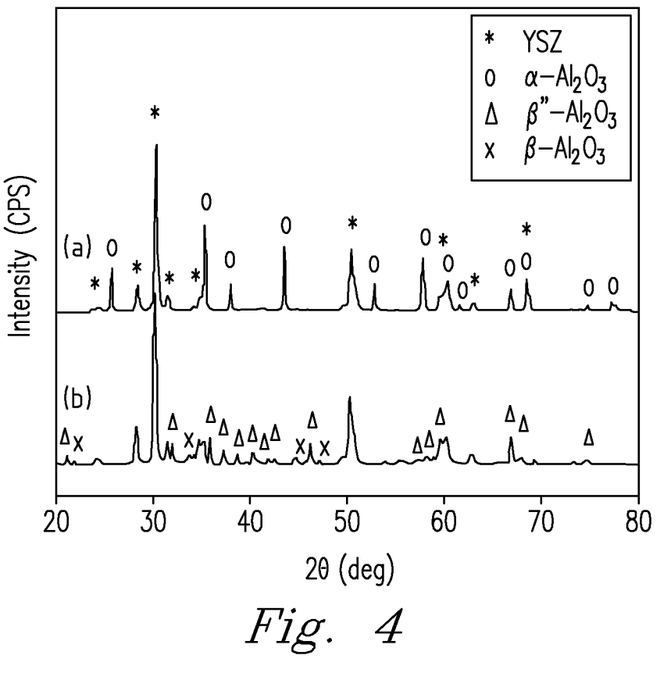
FIG. 4 is a graph of the XRD patterns of (a) as-sintered α—Al2O3/YSZ and (b) converted β"—Al2O3/YSZ used in experiments designed to demonstrate one embodiment of the present invention.

The XRD patterns of the as-sintered and converted alumina materials are shown in FIG. 4. No peaks other than those expected for $\alpha$—$Al_2O_3$ and YSZ were observed in FIG. 2a, indicating that no significant chemical reaction occurred between the two components. After conversion, all the peaks for YSZ remained unchanged while those peaks for $\alpha\, Al_2O_3$ were converted to peaks characteristic of $\beta"$—$Al_2O_3$, as seen in FIG. 2b. In addition to $\beta"$—$Al_2O_3$, a small portion of $\beta$—$Al_2O_3$ was also observed, which typically coexists with $\beta"$—$Al_2O_3$.

The microstructures of $\alpha$—$Al_2O_3$ and YSZ before and after conversion are compared. The light and dark grains are YSZ and $\alpha$—$Al_2O_3$, respectively. There was no significant morphology charge during the conversion process and $\beta"$—$Al_2O_3$ showed a similar grain size (less than 5 micrometers) as that prior a) conversion. A dense and fine-grained microstructure was achieved, which is one of the advantages of the vapor phase approach as it is usually difficult to obtain a similar microstructure with conventional high-temperature sintering process. Sodium typically is homogenously distributed in the converted $\beta"$—$Al_2O_3$ to ensure a good sodium-ion conduction and an evenly distributed current density. The cross section of the converted BASE was examined using SEM/EDS line scan. Sodium was found to he well-distributed across the 1-mm-thick BASE. The resistivity of the converted BASE was measured. using a Na BASE Na symmetric cell and was found to be 27.5 cm at 300° C, which was consistent with a previous study for converted BASE.

Figure 5:
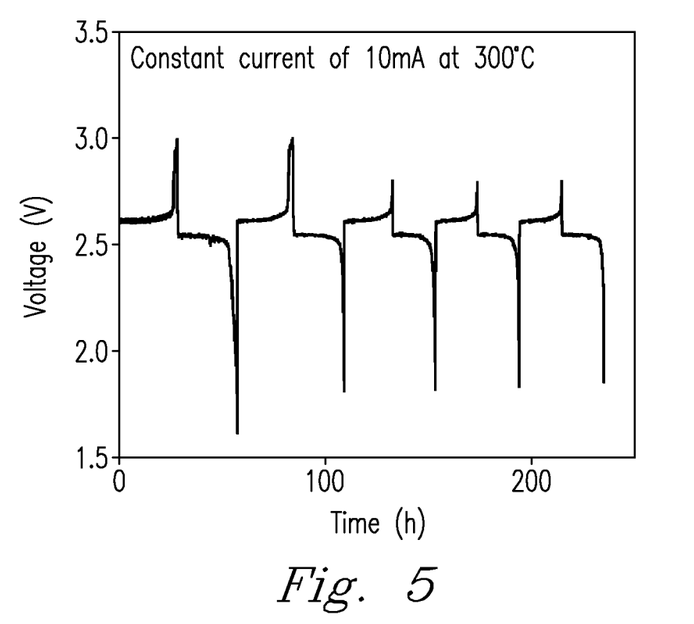
FIG. 5 is a graph of the initial five charge-discharge cycles of a button cell.
Figure 6:
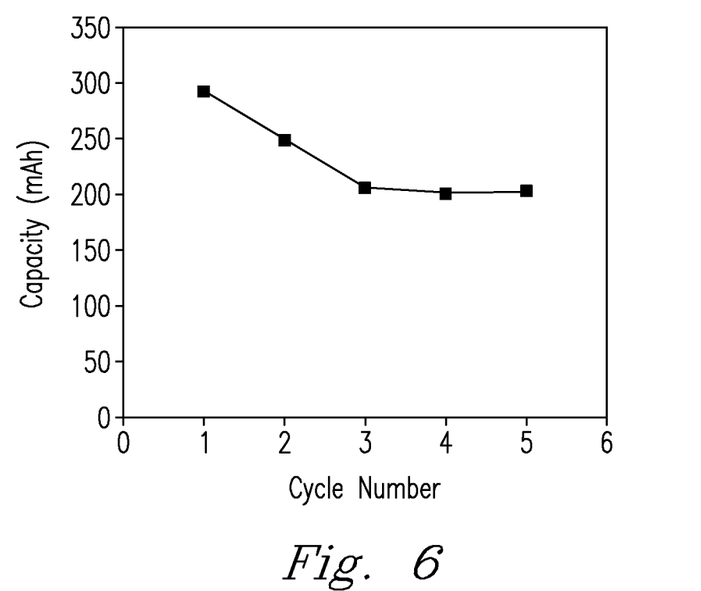
FIG. 6 is a graph of the corresponding discharge cell capacity of the button cell.

FIG. 5 gives cycle behavior of a button cell during first five cycles. The charge and discharge voltage profiles were symmetrical in each cycle, indicating that sodium ion transport across the BASE was essentially reversible. Discharge capacity of the cell was calculated and plotted in FIG. 6. The capacity for first cycle was 292 mAh, which was close to the theoretical for the given amount of cathode material (300 mAh for 2 g cathode).

Figure 7:
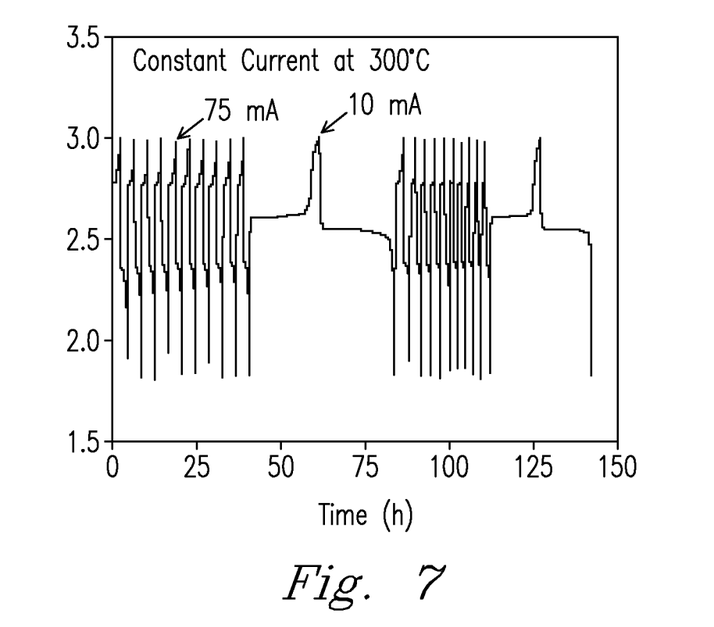
FIG. 7 is a graph of the cycling behavior of a button cell at around C/3 rate with low current rejuvenation cycles.
Figure 8:
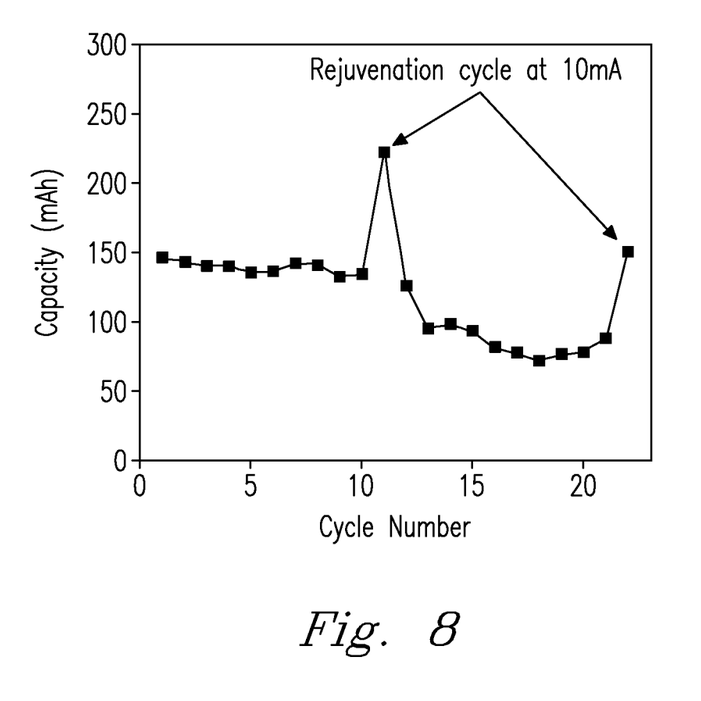
FIG. 8 is a graph of the corresponding discharge cell capacity of t e button

The cell capacity decreased significantly in first three cycles and was stabilized at 203 mAh after five cycles. Once the performance was stable, the cell was continuously cycled at around C/3 rate (i.e., 75 mA), as shown in FIG. 7. The corresponding cell capacity was plotted in FIG. 8. It can be seen that the capacity gradually decreased from 146 to 87 mAh after 20 cycles even with the low current rejuvenation cycles. The capacity loss during cycling is generally diagnosed to be related to growth of either nickel or sodium chloride grains within the cathode. During charge, small grains are consumed and tend to redistribute on the surface of large grains during the following discharge. As a result, the large grains become even larger while the smaller grains are consumed with cycling. The large crystal growth from the process reduces the materials accessibility for further charge/discharge and results in a loss of cell capacity with time. The microstructure of the cathode after cycling was analyzed using SEM. The NaCl, Ni as well as $NiCl_2$ grains were identified by SEM/EDS analysis at 50% SOC (state of charge). There was almost no change in the morphology of Ni particle; however, the growth of NaCl grain is apparent. For example, the NaCl grain size was around 30 μm after cycling, which is more than ten times of that prior to cycling (~3 pm).

BASE was successfully converted from tape-cast α—$Al_2O_3$/YSZ disc via vapor phase process. The resistivity of converted BASE was 27.5 ohm-cm at 300° C., which was in agreement with the reported results. Planar sodium-nickel chloride cell using the BASE was constructed and operated for about 20 days without cell failure. The loss in cell capacity during cycling was observed, which was likely re a o irreversible NaCl grain growth d charge/discharge process.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof, Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary, Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

We claim:

1. A method of making a molten sodium battery comprising:
   a. providing a first metallic interconnect frame having a first interconnect vent hole, anode chamber and cathode chamber;
   b. providing a second metallic interconnect frame having a second interconnect vent hole, anode chamber and cathode chamber;
   c. interposing an electrolyte plate having a cathode vent hole and an anode vent hole between the metallic interconnect frames; and
   d. sealing the metallic interconnect frames and the electrolyte plate thereby forming gaseous communication between the anode chamber of the first interconnect frame through the anode vent holes and gaseous communication between the cathode chamber of the second interconnect frame through the cathode vent holes, wherein the vent holes minimize a pressure differential within the battery during a charge/discharge cycle.

2. The method of claim 1 further comprising stacking a plurality of electrolyte plates and metallic interconnect frames, wherein each interconnect frame is disposed on opposite sides of each electrolyte plate, each electrolyte plate having a cathode vent hole and an anode vent hole, and each interconnect frame having an interconnect vent hole, and wherein the plurality of plates and interconnect frames are sealed.

3. The method of claim 2 further comprising a pressure accumulator in gaseous communication with the cathode vent holes and the anode vent holes to simultaneously provide pressure relief to the stack while containing the gasses.

4. The method of claim 1 further comprising providing a cathode composition containing a transition metal and sodium chloride in the cathode chambers.

5. The method of claim 1 further comprising adding a secondary electrolyte into the cathode chambers through the cathode vent holes.

6. The method of claim 4 further comprising providing a cathode composition containing a transition metal, sodium chloride, and a secondary electrolyte in the cathode chambers.

7. The method of claim 4 wherein the transition metal is nickel.

8. The method of claim 1 wherein the electrolyte plate is formed of β" alumina solid electrolyte (BASE).

9. A molten sodium battery comprising:
   a. a first metallic interconnect frame having a first interconnect vent hole, anode chamber and cathode chamber;
   b. a second metallic interconnect frame having a second interconnect vent hole, anode chamber and cathode chamber; and
   c. an electrolyte plate having a cathode vent hole and an anode vent hole interposed between the metallic interconnect frames, wherein the interconnect frames and the electrolyte plate are sealed thereby forming gaseous communication between the anode chamber of the first interconnect frame through the anode vent holes and gaseous communication between the cathode chamber of the second interconnect frame through the cathode vent holes, wherein the vent holes minimize a pressure differential within the battery during a charge/discharge cycle.

10. The molten sodium battery of claim 9 further comprising a plurality of electrolyte plates and metallic interconnect frames, wherein each interconnect frame is disposed on opposite sides of each electrolyte plate, each electrolyte plate having a cathode vent hole and an anode vent hole, and each interconnect frame having an interconnect vent hole, and wherein the plurality of plates and interconnect frames are sealed, thus forming a stack.

11. The molten sodium battery of claim 10 further comprising a pressure accumulator in gaseous communication with the cathode vent holes to simultaneously provide pressure relief to the stack while containing the gasses.

12. The molten sodium battery of claim 9 further comprising a cathode composition containing a transition metal and sodium chloride in the cathode chambers.

13. The molten sodium battery of claim 12 wherein the transition metal is nickel.

14. The molten sodium battery of claim 9 further comprising a secondary electrolyte added into the cathode chambers through the cathode vent holes.

15. The molten sodium battery of claim 9 further comprising a cathode composition containing a transition metal, sodium chloride, and a secondary electrolyte in the cathode chambers.

16. The molten sodium battery of claim 9 wherein the electrolyte plate is formed of β″ alumina solid electrolyte (BASE).

17. A molten sodium battery comprising a plurality of electrolyte plates and metallic interconnect frames, wherein each interconnect frame is disposed on opposite sides of each electrolyte plate, each plate having a cathode vent hole and an anode vent hole, and each interconnect frame having an interconnect vent hole, an anode chamber and a cathode chamber, and wherein the plurality of plates and interconnect frames are sealed, wherein the vent holes minimize a pressure differential within the battery during a charge/discharge cycle.

18. The molten sodium battery of claim 17 wherein gaseous communication between anode chambers through the anode vent holes and gaseous communication between cathode chambers through the cathode vent holes are formed.

19. The molten sodium battery of claim 18 further comprising a cathode composition containing a transition metal and sodium chloride in the cathode chambers.

20. The molten sodium battery of claim 19 wherein the transition metal is nickel.

21. The molten sodium battery of claim 17 further comprising a secondary electrolyte added into the cathode chambers through the cathode vent holes.

22. The molten sodium battery of claim 17 wherein the electrolyte plates are formed of β″ alumina solid electrolyte (BASE).

23. The molten sodium battery of claim 17 further comprising a pressure accumulator in gaseous communication with the cathode vent holes and the anode vent holes to simultaneously provide pressure relief to the stack while containing the gasses.

24. A molten sodium battery comprising:
a. a first metallic interconnect frame having a first interconnect vent hole, anode chamber and cathode chamber;
b. a second metallic interconnect frame having a second interconnect vent hole, anode chamber and cathode chamber;
c. an electrolyte plate formed of β″ alumina solid electrolyte (BASE) having a cathode vent hole and an anode vent hole interposed between the metallic interconnect frames, wherein the interconnect frames and the electrolyte plate are sealed thereby forming gaseous communication between the anode chamber of the first interconnect frame through the anode vent holes and gaseous communication between the cathode chamber of the second interconnect frame through the cathode vent holes;
d. a cathode composition containing nickel and sodium chloride in the cathode chambers; and
e. a pressure accumulator in gaseous communication with the cathode vent holes and the anode vent holes to simultaneously provide pressure relief to the stack while containing the gasses.

25. A molten sodium battery comprising:
a. a plurality of electrolyte plates formed of β″ alumina solid electrolyte (BASE);
b. a plurality of metallic interconnect frames, wherein each interconnect frame is disposed on opposite sides of each electrolyte plate, each plate having a cathode vent hole and an anode vent hole, and each interconnect frame having an interconnect vent hole, anode chamber and cathode chamber, and wherein the plurality of plates and interconnect frames are sealed and wherein gaseous communication between anode chambers through the anode vent holes and gaseous communication between cathode chambers through the cathode vent holes are formed; and
c. a cathode composition containing nickel and sodium chloride in the cathode chambers; and
d. a pressure accumulator in gaseous communication with the cathode vent holes and the anode vent holes to simultaneously provide pressure relief to the stack while containing the gasses.

* * * * *